US008474961B2

(12) United States Patent
Enderle et al.

(10) Patent No.: US 8,474,961 B2
(45) Date of Patent: Jul. 2, 2013

(54) SYSTEM AND METHOD FOR EXTRACTING SOLID-INK PELLETS FROM A CONTAINER

(75) Inventors: Jan M. Enderle, Rochester, NY (US); Matthew Fabrizio, Rochester, NY (US); Srinivasa R. Deshiikan, Wilsonville, OR (US); Michael Brundige, Rochester, NY (US)

(73) Assignee: Xerox Corporation, Norwalk CT ( * ) Notice: Subject to any disclaimer, the term of this patent is extended or adjusted under 35 U.S.C. 154(b) by 689 days.

(21) Appl. No.: 12/704,505

(22) Filed: Feb. 11, 2010

(65) Prior Publication Data

US 2011/0193917 A1 Aug. 11, 2011

(51) Int. Cl.
*B41J 2/175* (2006.01)
*G01D 11/00* (2006.01)

(52) U.S. Cl.
USPC .................................. 347/88; 347/85; 347/99

(58) Field of Classification Search
USPC ................................................ 347/85, 88, 99
See application file for complete search history.

(56) References Cited

U.S. PATENT DOCUMENTS 6,712,461 B2 * 3/2004 Haan et al. ...................... 347/88
7,887,173 B2 * 2/2011 Jones .............................. 347/88

* cited by examiner

*Primary Examiner* — Jannelle M Lebron
(74) *Attorney, Agent, or Firm* — Joseph E. Root

(57) ABSTRACT

The present disclosure provides systems and methods for supplying solid-ink pellets from a container to a printing apparatus. The solid-ink pellets are held in a collapsible, hermetic bag, which is carried in the container. The bag is partially or fully transparent. A vacuum interface provides an access point to the bag. Further, a perforated nozzle, adapted to engage the vacuum interface, provides airflow within the bag and is configured to apply a suction force to extract solid-ink pellets from the bag.

11 Claims, 6 Drawing Sheets

SYSTEM AND METHOD FOR EXTRACTING SOLID-INK PELLETS FROM A CONTAINER

TECHNICAL FIELD

The presently disclosed embodiments relate to supplying solid-ink pellets for printing and more particularly, to devices that supply solid-ink pellets from a portable container.

BACKGROUND

An image-forming apparatus, such as a printer, a fax machine, or a photocopier, includes a system for storage and extraction of ink pellets from a container, for delivery to the image-forming apparatus. Typically, the ink pellets are extracted from the container and transported to a hopper, which supplies ink to the image-forming device.

Presently, for extracting pelletized solid ink for future print media production, the ink is drawn out of a barrel with a vacuum tube. This method is effective, but as a package, the barrel and other internal components are bulky, heavy, expensive, and they are difficult to dispose of and recycle, once the ink barrel becomes empty. Additionally, the equipment for filling a custom barrel is also expensive. And, as a barrel is generally opaque, an operator managing such a system cannot easily discern information about different attributes related to the ink, such as the quantity and color of ink pellets remaining in the barrel.

Also, barrel systems have proved difficult to work with. Ink or other objects, for example, may obstruct the nozzle, preventing successful extraction of ink pellets. Further, the ink pellets in the barrel are susceptible to contamination due to moisture and dirt during transport and extraction.

It would be highly desirable to have a relatively simple and cost effective system for providing storage and extraction of ink pellets. Such a solution would provide customers a convenient and manageable set-up during operation and would allow transport and extraction of ink pellets without risk of contamination.

SUMMARY

One embodiment of the present disclosure provides a system for supplying solid-ink pellets to a printing apparatus from a rigid container. The solid-ink pellets are held in a collapsible, hermetic bag, which is carried in the container. The bag includes a vacuum interface to provide an access point. Further, a perforated nozzle, designed as a substantially hollow, perforated member, extending into the bag, is adapted to engage the vacuum interface. A vacuum hose, coupled to the nozzle through the vacuum interface, admits a suction force, through the nozzle, into the bag to extract the solid-ink pellets from the bag. Moreover, a lumen provides airflow within the bag and is coupled to the nozzle through the vacuum interface.

Another embodiment discloses a method for supplying solid-ink pellets to a printing apparatus from a rigid container. A collapsible, hermetic bag, including the solid-ink pellets, is carried in the container. A vacuum interface offers an access point to the bag, generating negative pressure within the bag using a perforated nozzle that engages the vacuum interface. A lumen fluidizes the solid-ink pellets by creating positive pressure within the bag. The lumen is connected to the perforated nozzle through the vacuum interface. The method then extracts the solid-ink pellets from the bag using a suction force, exerted through the nozzle.

DETAILED DESCRIPTION

The following detailed description is made with reference to the figures. Preferred embodiments are described to illustrate the disclosure, not to limit its scope, which is defined by the claims. Those of ordinary skill in the art will recognize a number of equivalent variations in the description that follows.

The present disclosure describes various embodiments of a system and a method for supplying solid-ink pellets from a rigid container. The solid-ink pellets are held in a collapsible, hermetic bag, which is carried in the container. A vacuum interface, providing an access point to the bag, is configured to engage a perforated nozzle. The nozzle provides airflow within the bag that fluidizes the solid-ink pellets and facilitates smoother extraction by the nozzle. A suction force, admitted into the bag by the nozzle, extracts the solid-ink pellets from the bag and delivers the pellets to the appropriate location.

Figure 1:
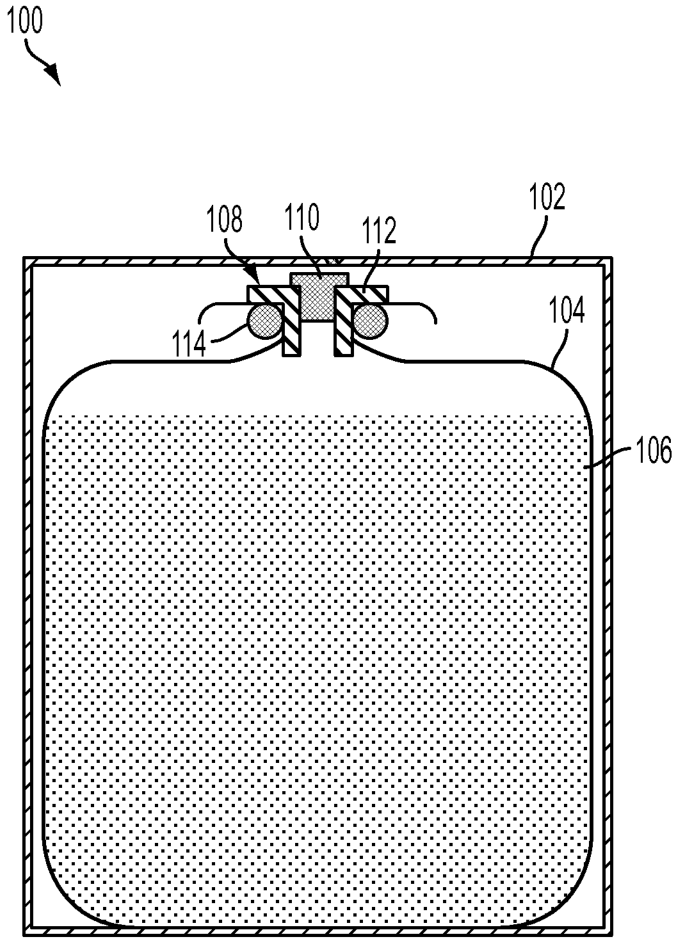
FIG. 1 illustrates an exemplary embodiment of a system for supplying solid-ink pellets to a printing apparatus from a rigid container.

FIG. 1 illustrates an exemplary embodiment of a system 100 for supplying solid-ink pellets to a printing apparatus from a rigid container 102. The container 102 structure can be a box, a cage, a wheeled cart, a drum, or any other structure imparting support to an enclosed bag 104. The container 102 may or may not include a lid. Any rigid material, such as wood, plastic, and metal, can be employed for forming the container 102. In one embodiment, the container 102 may be formed of a flexible material (for example, cloth or flexible plastic) supported by a frame, such that the resulting structure is a rigid container, capable of supporting a bag within.

In the present disclosure, the system 100 may deliver the extracted solid-ink pellets to a hopper (not shown), which acts as a source of ink for an attached image-forming apparatus (not shown). The rigid container 102 encloses the collapsible, hermetic bag 104, protecting the bag 104 during transportation. The bag 104 can be made of plastic, or any other airtight and flexible material. Solid-ink pellets 106 are held in the bag 104, which ensures that the solid-ink pellets 106 remain clean and dry.

A vacuum interface 108, including a plugging device 110, a flange 112, and a seal 114 (such as an o-ring or a rubber band), provides an access point to the bag 104. The vacuum interface 108 is fitted onto an opening to the bag 104. The seal 114 fits around the flange 112, which may be inserted into the opening to the bag 104. The flange 112 presents access to the bag 104, which is secured using the plugging device 110, such as a plug or a cap. In order to put the system 100 in operation, an operator simply slides or carries the container 102 into place (either within the attached device or next to the device), opens the container 102 and removes the plugging device 110.

Figure 2:
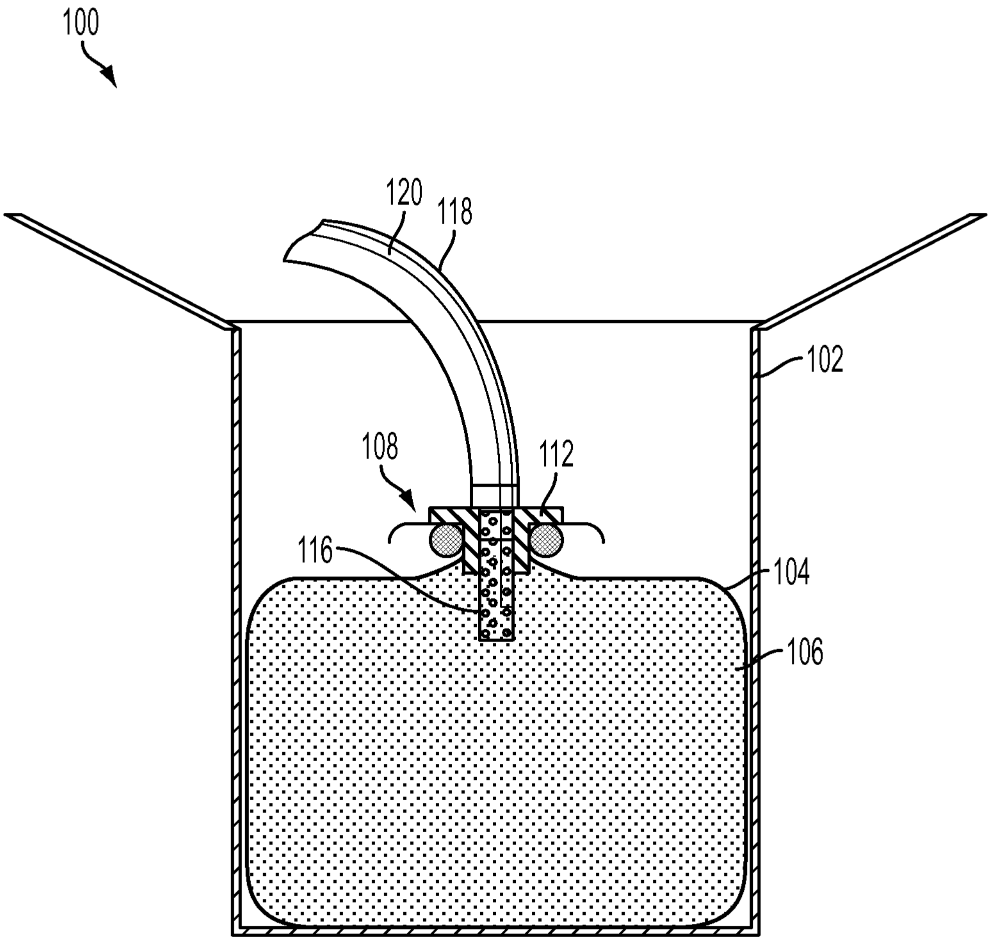
FIG. 2 illustrates the system shown in FIG. 1 in an operational mode.

FIG. 2 illustrates the system 100 in an operational mode. An operator inserts a perforated nozzle 116 into the vacuum interface 108, such that the vacuum interface 108 provides a hermetic seal between the perforated nozzle 116 and the bag 104. The perforated nozzle 116 is a substantially hollow, perforated structure extending into the bag 104. A vacuum hose 118, attached to the perforated nozzle 116, in a detachable manner, forms a hermetic seal between the vacuum hose 118 and the perforated nozzle 116 and admits a suction force into the bag 104 for extracting the solid-ink pellets 106 from the bag 104. The vacuum hose 118 can be attached to the perforated nozzle 116 through one of the many suitable methods known to those skilled in the art, such as press fit, glue, or interference fit. A tight fit also exists between one end of the vacuum hose 118 and the flange 112. One end of the vacuum hose 118 fits into the flange 112, while the other end of the vacuum hose 118 connects to a vacuum source (not shown). In one implementation, the vacuum hose 118 delivers the extracted solid-ink pellets 106 to a hopper (not shown), which serves as the immediate source for the solid-ink pellets 106 to the device utilizing the solid-ink pellets 106. Consider the example of an image-forming apparatus, such as a copy machine. A hopper attached to the copy machine retrieves ink pellets from a container/bag assembly, such as the system 100, through a vacuum hose that has one end connected to the hopper. Alternatively, the vacuum hose may be connected to the copy machine, directly or indirectly, through another device. The copy machine then utilizes the ink in the hopper for printing copied images on sheets of paper.

In some embodiments of this disclosure, a control module controls the extraction of the solid-ink pellets 106 from the bag 104. For example, the control system monitors the amount of solid-ink pellets in the hopper and initiates extraction from the bag for re-filing the hopper whenever required, or when the ink level reaches a selected low level.

The perforated nozzle 116 is designed to allow even and efficient extraction of the solid-ink pellets 106, leaving little or no solid-ink pellets 106 in the bag 104 once the extraction is complete. An "assist" airflow, necessary to fluidize the flow of the solid-ink pellets 106, is also introduced into the bag 104 by way of a lumen 120 having one end coupled to the perforated nozzle 116. In order to facilitate extraction from the bag 104, the absolute value of the negative pressure introduced within the bag 104 by the perforated nozzle 116 may be equal to or greater than the absolute value of the positive pressure provided by the "assist" airflow. The absolute value of the negative pressure can be maintained higher than the absolute value of the positive pressure, in case it is preferred that the bag 104 collapses during the solid-ink pellet 106 extraction, conforming to the shape of the solid-ink pellets 106. In one embodiment, one end of the lumen 120 is open to the atmosphere, serving as the positive pressure source, while the other end of the lumen 120 may be connected to the perforated nozzle 116. In this case, the positive pressure and the negative pressure have the same absolute values. In a further embodiment, the negative pressure is at least approximately 350 Pa.

Figure 3:
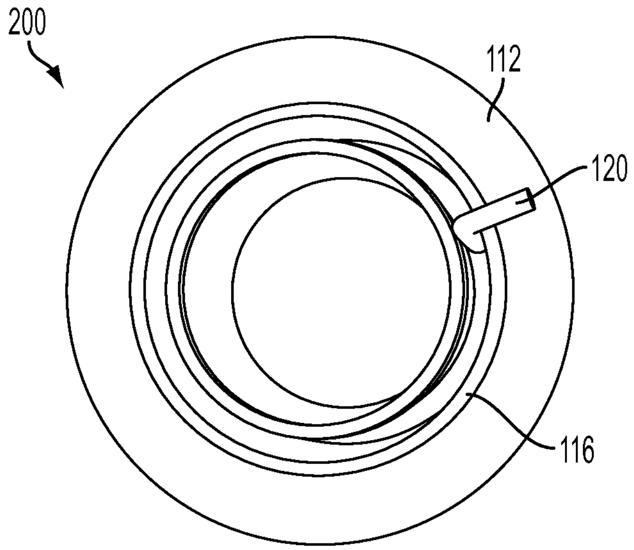
FIGS. 3-5 are views of an exemplary embodiment of the arrangement of a nozzle and a lumen, which are part of a vacuum interface.
Figure 4:
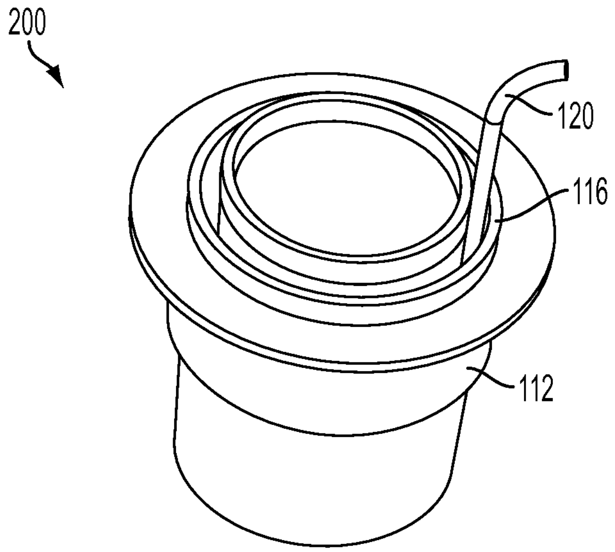
Figure 5:
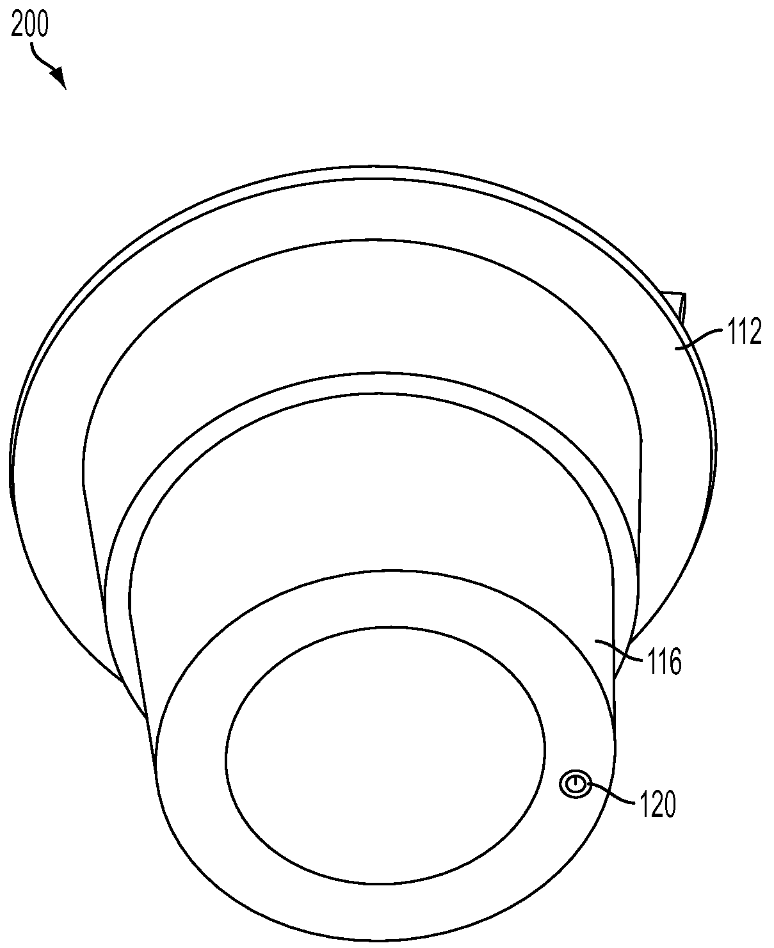

The lumen 120 can lie within the vacuum hose 118, running the length of the vacuum hose 118 either co-axially or, as shown in FIG. 2, positioned at any point within the vacuum hose 118. Alternatively, the lumen 120 can lie in a pocket within the wall of the vacuum hose 118, extending into the perforated nozzle 116. FIGS. 3, 4, and 5 show different views of an exemplary embodiment 200 of the arrangement of the nozzle 116 and the lumen 120, which are part of the vacuum interface 108, where the lumen 120 lies in a pocket within the wall of the vacuum hose 118 (perforations not shown for the purpose of simplicity). FIG. 3 shows the top view the exemplary embodiment 200, and FIG. 4 illustrates another view of the exemplary embodiment 200, where the vacuum hose 118 engages the perforated nozzle 116. FIG. 5 shows an isometric view of the exemplary embodiment 200 from the end of the perforated nozzle 116 that is inside the bag 104. One end of the lumen 120, which provides airflow to the bag 104, may terminate within the interior of the perforated nozzle 116, such that the "assist" airflow blows air on the perforations, thus fluidizing the flow of the solid-ink pellets 106 and eliminating any blockages in the perforations that may form due to clumping together of the solid-ink pellets 106. For example, if the solid-ink pellets 106 include wax-based, solid-ink pellets, at higher temperatures, conglomeration of the pellets can take place, leading to larger pellets that can create blockages in the perforations. In the embodiments described in FIGS. 2, 3, 4, and 5, the other end of the lumen 120 is connected to a positive airflow source (not shown).

Returning to FIG. 2, the perforations in the perforated nozzle 116 allow extraction of the solid-ink pellets 106 from all around the perforated nozzle 116. Table 1 lists the values of properties, such as bulk density, size range, and melting point of the solid-ink pellets 106. The perforated nozzle 116 can be tailored to these properties; for example, the size of the perforations in the perforated nozzle 116 is based on the size range of the solid-ink pellets 106 being extracted.

In one embodiment, the size of a perforation in the nozzle 116 may range from approximately one to approximately twelve times the average size of the solid-ink pellets 106. For example, in one embodiment, the size of the perforations in the nozzle 116 can lie in a range from approximately 9.5 mm to approximately 12.5 mm. If the size of the perforations is much greater than the size of the solid-ink pellets 106, a very high negative pressure will be required to extract the solid-ink pellets 106 from the bag 104. The perforations may vary in shape, depending on the system 100 requirement. The shape of the perforations may be round, elliptical, slit-shaped, or any other shape that suits the system 100 requirements.

In one embodiment, the perforated nozzle 116 has a V- or U-shaped contoured surface, which allows the solid-ink pellets 106 to flow smoothly through the valleys of the U- or V-shape. In the event that the bag 104 becomes stuck to the perforated nozzle 116 due to the suction force, a perforated nozzle, having a V- or U-shape, minimizes the obstruction caused by the stuck bag 104 by allowing continued extraction of the solid-ink pellets 106 from the bag 104. In one implementation, the outer bottom surface of the bag 104 may be attached to the inner bottom surface of the container 102 using an adhesive, preventing the problem of the bag 104 becoming drawn against the perforated nozzle 116.

TABLE 1

| | Bulk Density ($kg/m^3$) | Size Range (mm) | Melting Point (Celsius) |
|---|---|---|---|
| Colored Ink Pellets | 640.2 | 0.43-1.03 | 84-94 |
| Clear Ink Pellets | 552 | 1-9 | 102-107 |

As the solid-ink pellets 106 are extracted from the bag 104, the container 102 supports the bag 104, such that the bag 104 conforms to the remaining solid-ink pellets 106 and collapses in a substantially symmetrical manner. In another implementation, in order to encourage even extraction of the solid-ink pellets 106, the perforated nozzle 116 is made to slide downwards towards the bottom of the bag 104, as the solid-ink pellets 106 are being extracted. For example, a weight or load can be applied to the perforated nozzle 116, facilitating downward collapsing of the bag 104 as the solid-ink pellets 106 are being extracted from the bag 104.

The bag 104 is partially or fully transparent, allowing a machine operator to visually detect the quantity of the solid-ink pellets 106 remaining in the bag 104. A partially or fully transparent bag allows easy identification of the color of the solid-ink pellets 106 as well.

In one embodiment of the disclosure, the container 102 provides an area for labeling. In a further embodiment, the container 102 includes a space to carry a monitoring device (not shown), which may be any electronic device capable of performing the required functions, ranging from a Radio Frequency (RF) based device to a card including machine readable codes. The monitoring device can reside on the container 102, such that the monitoring device can be read either by a reader device on the system 100 as the container 102 is moved into position, or removed from the container 102 and interfaced with a reader device. In alternate embodiments, the reader device may be positioned on the perforated nozzle 116 or on the lumen 120.

The monitoring device can perform several functions, including authentication of the solid-ink pellets 106, tracking the estimated quantity of the remaining solid-ink pellets 106, counting down to the empty state of the bag 104 and then disabling re-fill by a non-authorized provider, identifying an attribute of the solid-ink pellets 106, such as the color of the solid-ink pellets 106 or other physical properties, identifying a date or location of manufacture, loading, or sale of the solid-ink pellets 106, describing the name of a vendor, supplier, or intended user of the solid-ink pellets 106, and describing a business relationship relating to the solid-ink pellets 106. Such information may be conveyed to the attached machine, so the operator may be flagged in case operator intervention is required. The monitoring device, when recognized by a reader device, signals the system 100 to start extraction. In an alternate embodiment, an operator feeds instructions into a user interface, initiating the extraction of the solid-ink pellets 106.

In one embodiment of the disclosure, the flange 112 for a particular color set, associated with a printer, has a different size or shape than flanges for other color sets, thus restricting the ink supplied to a printer to a predetermined color set.

Figure 6:
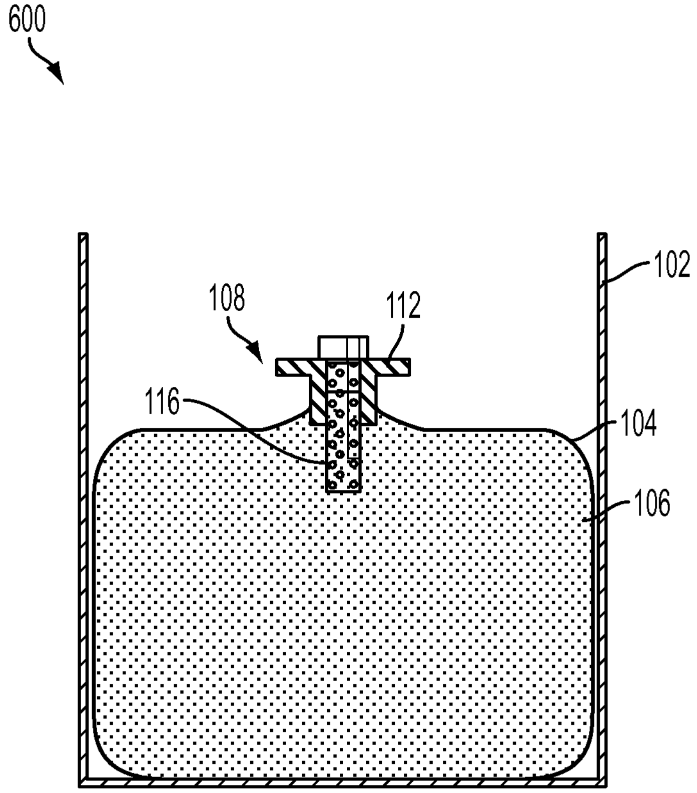
FIG. 6 shows an exemplary embodiment of a rigid, solid-ink container.

FIG. 6 shows an exemplary embodiment 600 of a rigid, solid-ink container 102, including the flange 112 and the perforated nozzle 116 as a combined part, such that they can be shipped as part of the packaged material. The collapsible, hermetic bag 104, which is partially or fully transparent, includes the solid-ink pellets 106. The vacuum interface 108 includes the perforated nozzle 116 that fits into the flange 112. The vacuum interface 108 may further include a seal such as an o-ring or a rubber-band (not shown).

Figure 7:
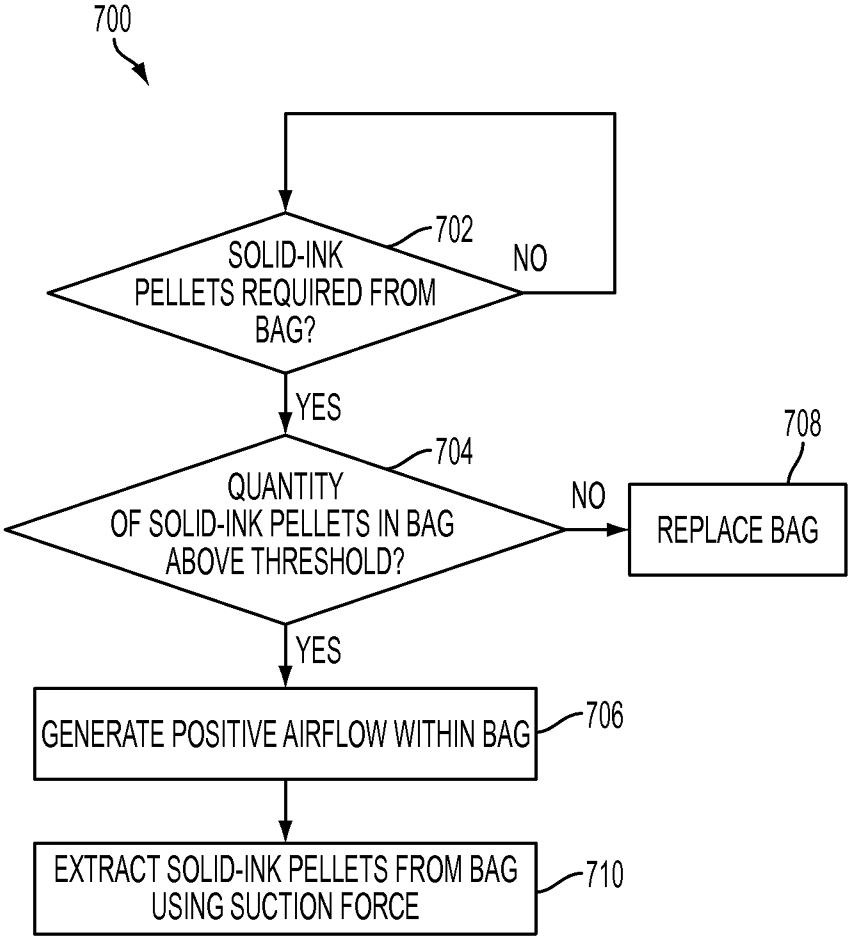
FIG. 7 is a flowchart of an exemplary method for supplying solid-ink pellets to a printing apparatus from a rigid container.

FIG. 7 is a flowchart of an exemplary method 700 for supplying solid-ink pellets to a printing apparatus from a rigid container. The container carries a collapsible, hermetic bag holding solid-ink pellets. At step 702, the method 700 determines whether solid-ink pellets are required from the bag. In one embodiment, the bag is attached to an image-forming apparatus such as a copy machine. A hopper, serving as an immediate source of ink for the copy machine, can generate a request for solid-ink pellets in the event that the hopper runs out of ink. A vacuum interface, which may include a flange, seal, plug, or cap, provides an access point to the bag. A perforated nozzle fits into the vacuum interface and provides a suction force for the extraction of solid-ink pellets from the bag. A positive airflow is also created within the bag by way of a lumen, for fluidizing the solid-ink pellets during extraction. The absolute value of the negative pressure introduced within the bag may be equal to or greater than the absolute value of the positive pressure provided by the "assist" airflow, depending on system requirements, as described in relation with FIG. 2.

If it is determined, at step 702, that solid-ink pellets should be extracted from the bag, the method 700 proceeds to step 704. If not, the method 700 returns to step 702.

If it is determined that the quantity of solid-ink pellets in the bag is above a predetermined threshold (at step 704), positive airflow is generated within the bag, at step 706. If it is determined, however, that an insufficient quantity of solid-ink pellets remain in the bag (step 704), an operator can replace the bag or the bagged container with a bag or bagged container filled with solid-ink pellets, respectively, at step 708. Once the quantity of solid-ink pellets in the bag is determined to be sufficient, a suction force is admitted through a vacuum hose into the bag for extracting the solid-ink pellets from the bag, as shown at step 710. The bag is partially or fully transparent, allowing an operator to check the quantity, color, or other attributes related to the solid-ink pellets. In one embodiment, the operator determines that the quantity of the solid-ink pellets in the bag is insufficient, the bag or bagged container is replaced. In an alternate embodiment, the operator is instructed through a user interface to remove the empty bag and to install a new one. In another embodiment, an RF device performs the monitoring of the solid-ink pellets, as already described in relation with FIG. 2.

In one embodiment, the size of a perforation in the nozzle may range from approximately one to approximately twelve times the average size of the solid-ink pellets. For example, in one embodiment, the size of the perforations in the nozzle can lie in a range from approximately 9.5 mm to approximately 12.5 mm. If the size of the perforations is much greater than the size of the solid-ink pellets, a very high negative pressure will be required to extract the solid-ink pellets from the bag. The perforations may vary in shape, depending on the system requirement. The shape of the perforations may be round, elliptical, slit-shaped, or any other shape that suits system requirements.

In one embodiment, the perforated nozzle is U- or V-shaped. A perforated and U- or V-shaped nozzle minimizes the impact of the bag or another object becoming drawn against the nozzle, allowing continued extraction of the solid-ink pellets from the bag, as discussed in conjunction with FIG. 2.

During extraction, a load or weight may be attached to the nozzle to ensure that the bag collapses downwards in a substantially symmetrical manner as the solid-ink pellets are extracted from the bag.

In some embodiments of this disclosure, a control module controls the extraction of the solid-ink pellets from the bag. Considering the example of the copy machine, if the hopper runs out of solid-ink pellets, the control module initiates extraction of the solid-ink pellets from the bag for re-filling the hopper.

It should be noted that the description below does not set out specific details of manufacture or design of the various components. Those of skill in the art are familiar with such details, and unless departures from those techniques are set out, techniques, designs and materials known in the art should be employed. Those in the art are capable of choosing suitable manufacturing and design details.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for supplying solid-ink pellets from a rigid container to a printing apparatus, the system comprising:

a structure forming a substantially rigid container;

a collapsible, hermetic bag, carried in the container, wherein the bag contains the solid-ink pellets;

a vacuum interface for providing an access point to the bag;

a perforated nozzle adapted to engage the vacuum interface, the nozzle comprising a substantially hollow, perforated member extending into the bag;

a vacuum hose coupled to the nozzle through the vacuum interface, wherein the vacuum hose is configured to admit a suction force, through the nozzle, into the bag to extract the solid-ink pellets from the bag; and a lumen configured to provide airflow within the bag, wherein the lumen is coupled to the nozzle through the vacuum interface.

2. The system of claim 1 further comprising a monitoring device configured to monitor the solid-ink pellets in the bag.

3. The system of claim 1, wherein the bag is partially or fully transparent.

4. The system of claim 1, wherein the perforated nozzle is configured to provide airflow within the bag.

5. The system of claim 1, wherein the nozzle is a hollow member defining a substantially U shape.

6. The system of claim 1, wherein the nozzle is a hollow member defining a substantially V shape.

7. The system of claim 1, wherein the nozzle includes a weight configured to facilitate downward collapsing of the bag as the solid-ink pellets are being extracted from the bag.

8. The system of claim 1, wherein the vacuum interface provides a hermetic seal between the nozzle and the bag.

9. The system of claim 1, wherein the outer bottom surface of the bag is attached to the inner bottom surface of the container.

10. The system of claim 1 further comprising a control module for controlling the extraction of the solid-ink pellets from the bag.

11. The system of claim 1, wherein the size of a perforation in the nozzle is approximately one to approximately twelve times the average size of the solid-ink pellets.

* * * * *